(No Model.)
F. ECAUBERT.
BRAKE FOR BICYCLES OR VEHICLES.
No. 588,270. Patented Aug. 17, 1897.
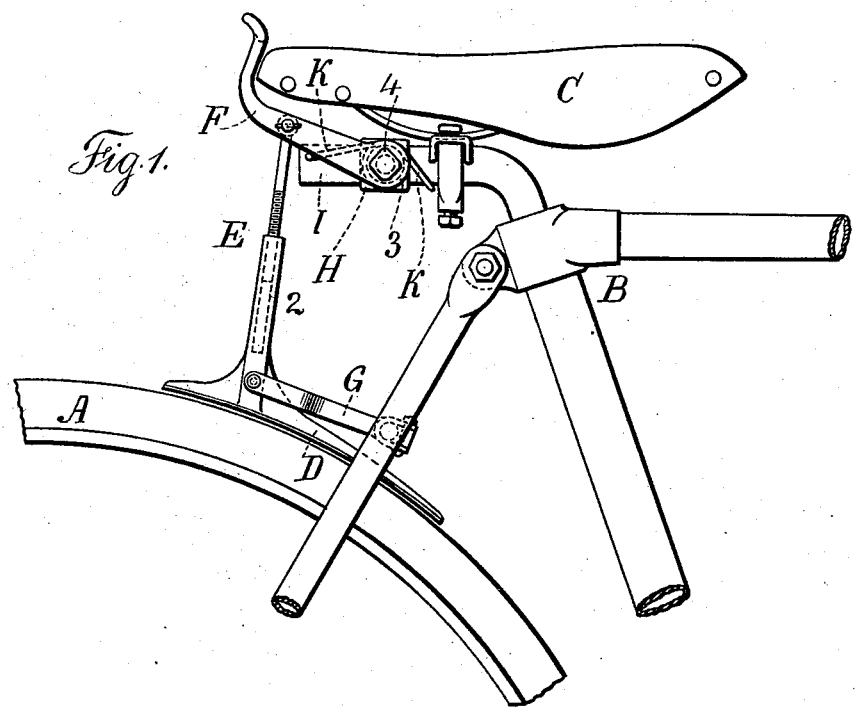
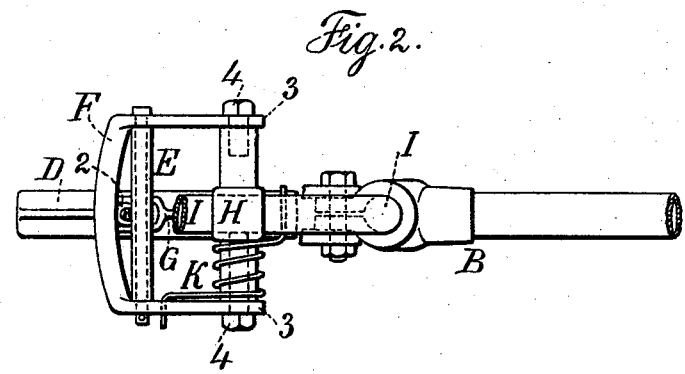
Witnesses:
J. Staib
Chas. H. Smith
Inventor:
Frederic Ecaubert
by L. W. Serrell & Son
attys

UNITED STATES PATENT OFFICE.

FREDERIC ECAUBERT, OF BROOKLYN, NEW YORK.

BRAKE FOR BICYCLES OR VEHICLES.

SPECIFICATION forming part of Letters Patent No. 588,270, dated August 17, 1897.

Application filed February 3, 1896. Serial No. 577,859. (No model.)

*To all whom it may concern:*

Be it known that I, FREDERIC ECAUBERT, a citizen of the United States, residing at Brooklyn, in the county of Kings and State of New York, have invented an Improvement in Brakes for Bicycles or Similar Vehicles, of which the following is a specification.

Difficulty has heretofore arisen in applying a brake to a bicycle, especially from the fact that such brake has usually been applied to the front wheel, and if the brake is applied when traveling at considerable speed the momentum may throw the rider over the front wheel and cause the cycle to turn over the front wheel at the same time. This is not so liable to happen when the brake is applied to the rear wheel, but at the same time the release of the brake, if the momentum is checked too suddenly, has not been automatic, and in cases of danger the brake is often applied so quickly as to tend to throw the rider, and there is not always presence of mind enough to slack upon the brake sufficiently to prevent the rider being thrown by the momentum.

The object of the present invention is to apply to the wheel a brake which is substantially automatic, such brake being operated by the weight of the rider and in such a position and direction that the tendency to throw the rider forward by the inertia as the vehicle may be stopped acts to release the brake and thereby only apply a force that can be advantageously used in stopping the rider and the bicycle as rapidly as possible without throwing the rider.

With the aforesaid object in view the brake is applied to the rear wheel and the brake-lever is adjacent to the rear portion of the saddle, so that the brake is actuated by the weight of the rider as he may move upon the saddle to the rear, and by this motion the brake can be applied with more or less power and rapidity, and should the weight be applied too suddenly, so that the stoppage of the bicycle tends to throw the rider forward, the movement of the person in relation to the saddle relieves the pressure of the brake and suddenly lets up on the same, so that the bicycle may move forward with less detaining force and thereby counteract the tendency to throw the rider and make the action of the brake substantially automatic to the extent that the inertia which may tend to throw the rider simultaneously relieves the brake and allows the bicycle and the rider to go on together instead of throwing the rider from the cycle.

In the drawings, Figure 1 is a side view, and Fig. 2 a plan view without the saddle.

I have represented a portion of the rear part of a bicycle, the rear wheel being shown at A, the frame at B, and a saddle at C. These parts may be of any desired size, shape, or character, and the brake-shoe D is advantageously applied to the rear wheel and is sufficiently long to give the proper bearing upon the surface of the pneumatic or other tire.

The brake-rod E extends up from the shoe D and is connected with the brake-lever F, and these parts may be of any desired shape and size, but the end of the brake-lever F is adjacent to the saddle, preferably at the rear of the same, so as to be actuated by the weight of the person when such person slides to the rear.

It is advantageous to employ a link G, pivoted at one end to the frame of the machine and at the other end to the brake-rod E or the upper end of the shoe D, and in the brake-rod E is an adjustment of any desired character. I have shown the tubular screw-threaded socket 2 receiving the screw-threaded end of the rod, the parts being such that the moving end of the lever F can be adjusted to the proper position relatively to the surface of the saddle C.

The brake-lever F may be of any desired character. I have represented the same in the form of a yoke or bow, the ends 3 of which are formed as eyes fastened upon the pivot-screws 4 at the ends of the stock H, which is made with an opening that receives into it the saddle-bar I, and this stock is firmly fastened to the saddle-bar by one of the pivot-screws 4 that forms a clamp, and the brake-lever F is advantageously bent up, so that the central part thereof forms a bar across the rear portion of the saddle and near the surface thereof, so that when the rider slips backwardly his weight will act upon the middle portion of the brake-lever F to press the same downwardly and apply the brake D to the wheel A, and in this operation the lever F swings upon its pivot studs or screws 4, and the link G also swings upon its pivots, and should the weight of the person or the portion thereof that is applied to the brake act to check the momentum too rapidly and to throw the rider forward by his inertia this forward movement causes the rider to slip forward upon the saddle or to rise upon his feet as they rest upon the pedals, and in either instance the pressure upon the brake-lever is lessened, so that the hold of the brake upon the wheel is proportionately reduced. Thus the apparatus is substantially automatic, because the pressure upon the brake is relieved automatically by the tendency to throw the rider off the saddle, and it will be apparent that the cycle can be stopped by the action of the brake as quickly as is consistent with the safety of the rider.

The upper end of the brake-rod E is advantageously united to the lever F by an eye and a cross-bar between the two parts of the brake-lever F, and any suitable spring or other device may be made use of to raise the brake-shoe from the wheel. I prefer to employ a helical spring K, coiled around the stock H at one side of the saddle-bar and having one end beneath the saddle-bar and the other end beneath the brake-lever F at one side thereof.

I do not limit myself to the construction shown of the connection between the brake and the portion of the connection against which the weight of the rider acts.

I claim as my invention—

1. The combination with the cycle-wheel, of a brake-shoe above the wheel, a swinging connection from the brake-shoe to the frame for holding the brake-shoe in position, a nearly vertical rod extending from the brake-shoe, a lever pivoted to the vertical rod and to the saddle-support and rising and projecting to the rear of the saddle so that the weight of the rider can be applied directly upon the projecting end of the lever, substantially as set forth.

2. The combination with the cycle-wheel, of a brake-shoe above the wheel, a swinging connection from the brake-shoe to the frame for holding the brake-shoe in position, a nearly vertical adjustable rod extending from the brake-shoe, a lever pivoted to the upper end of the vertical rod and a pivotal connection between the end of the lever and the saddle-bar, the rear portion of the lever extending to the rear and adapted to receive the rider whereby the weight of the rider is applied directly to the brake, substantially as set forth.

Signed by me this 31st day of January, 1896.

F. ECAUBERT.

Witnesses:
GEO. T. PINCKNEY,
S. T. HAVILAND.